United States Patent
McKee et al.

(10) Patent No.: US 12,001,865 B2
(45) Date of Patent: *Jun. 4, 2024

(54) CONTAINER-AS-A-SERVICE (CAAS) CONTROLLER FOR PRIVATE CLOUD CONTAINER CLUSTER MANAGEMENT

(71) Applicant: Hewlett Packard Enterprise Development LP, Spring, TX (US)

(72) Inventors: Bret Alan McKee, Santa Cruz, CA (US); Peter Erik Mellquist, Roseville, CA (US); Frederick Miles Roeling, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/188,562

(22) Filed: Mar. 23, 2023

(65) Prior Publication Data

US 2023/0229467 A1    Jul. 20, 2023

Related U.S. Application Data

(63) Continuation of application No. 16/908,083, filed on Jun. 22, 2020, now Pat. No. 11,625,256.

(51) Int. Cl.
*G06F 9/455* (2018.01)
*G06F 9/445* (2018.01)
(Continued)

(52) U.S. Cl.
CPC ...... *G06F 9/45541* (2013.01); *G06F 9/44505* (2013.01); *G06F 9/45558* (2013.01);
(Continued)

(58) Field of Classification Search
CPC ............ G06F 9/45541; G06F 9/44505; G06F 9/45558; G06F 9/5027; G06F 2009/45562;
(Continued)

(56) References Cited

U.S. PATENT DOCUMENTS 10,162,682 B2   12/2018   Smola et al.
10,379,835 B2   8/2019   Agarwal et al.
(Continued)

FOREIGN PATENT DOCUMENTS

CN   110502349 A   11/2019
CN   110569101 A   12/2019
(Continued)

OTHER PUBLICATIONS

AWS, "AWS Outposts", available online at <https://web.archive.org/web/20200616102338/https://aws.amazon.com/outposts/>, Amazon Web Services, Jun. 16, 2020, 14 pages.
(Continued)

*Primary Examiner* — Tammy E Lee
(74) *Attorney, Agent, or Firm* — Slater Matsil, LLP (57) ABSTRACT

Embodiments described herein are generally directed to a controller of a managed container service that facilitates selection among bare metal machines available within a private cloud. According to an example, a request is received by a Container-as-a-Service controller from a CaaS portal to create a cluster based at least in part on resources of a private cloud of a customer of a managed container service. An inventory of bare-metal machines available within the private cloud is received from a Bare-Metal-as-a-Service (BMaaS) provider associated with the private cloud. A particular bare metal machine is identified for the cluster by selecting among the available bare-metal machines based on cluster information associated with the request, the inventory, and a best fit algorithm configured in accordance with a policy established by the customer.

17 Claims, 10 Drawing Sheets

(51) Int. Cl.
  *G06F 9/50* (2006.01)
  *H04L 67/14* (2022.01)
  *H04L 67/51* (2022.01)

(52) U.S. Cl.
  CPC ............ *G06F 9/5027* (2013.01); *H04L 67/14* (2013.01); *H04L 67/51* (2022.05); *G06F 2009/45562* (2013.01); *G06F 2009/4557* (2013.01); *G06F 2209/505* (2013.01); *G06F 2209/508* (2013.01)

(58) Field of Classification Search
  CPC ....... G06F 2009/4557; G06F 2209/505; G06F 2209/508; H04L 67/51; H04L 67/14
  See application file for complete search history.

(56) References Cited

U.S. PATENT DOCUMENTS

| | | | |
|---|---|---|---|
| 10,860,362 | B2 | 12/2020 | Lal et al. |
| 10,972,449 | B1 | 4/2021 | Levin et al. |
| 10,992,540 | B1* | 4/2021 | Kandaswamy ..... H04L 41/0886 |
| 11,301,276 | B2 | 4/2022 | Mellquist et al. |
| 2013/0297802 | A1 | 11/2013 | Laribi et al. |
| 2014/0280961 | A1 | 9/2014 | Martinez et al. |
| 2015/0039764 | A1 | 2/2015 | Beloglazov et al. |
| 2015/0222515 | A1 | 8/2015 | Mimura et al. |
| 2017/0116025 | A1 | 4/2017 | Ghosh et al. |
| 2017/0235613 | A1 | 8/2017 | Smola et al. |
| 2018/0173513 | A1* | 6/2018 | Agarwal ................ G06F 16/182 |
| 2019/0097900 | A1 | 3/2019 | Rodriguez et al. |
| 2019/0122156 | A1 | 4/2019 | Asthana et al. |
| 2019/0286486 | A1 | 9/2019 | Ma et al. |
| 2020/0089518 | A1 | 3/2020 | Beyer et al. |
| 2020/0311573 | A1* | 10/2020 | Desai .................... H04L 41/147 |
| 2021/0117241 | A1 | 4/2021 | Xia |
| 2021/0160165 | A1* | 5/2021 | Zhu ....................... H04L 45/121 |

FOREIGN PATENT DOCUMENTS

| | | |
|---|---|---|
| JP | 2018-120408 A | 8/2018 |
| WO | 2017/200878 A1 | 11/2017 |

OTHER PUBLICATIONS

Cloudhedge, "Automated Containerization," 2020, pp. 1-6.
Google Cloud, "Anthos", available online at <https://web.archive.org/web/20200617004603/https://cloud.google.com/anthos/>, Jun. 17, 2020, 20 pages.
Hashicorp, "Use Cases", Introduction to Terraform, 2020, pp. 1-4.
HPE, "HPE Gen10 Security Reference Guide", Feb. 2019, 183 pages.
Jason Hennessey et al., "Hardware as a Service—Enabling Dynamic, User-level Bare Metal Provisioning of Pools of Data Center Resources," May 8, 2015, pp. 1-2.
Mohamed K. Hussein et al., "A Placement Architecture for a Container as a Service (CaaS) in a Cloud Environment," Journal of Cloud Computing: Advances, Systems and Applications, May 29, 2019, pp. 1-15.
Packet, "Kubernetes Cluster Autoscaler," 2020, pp. 1-7.
Rancher, "Deliver Kubernetes-as-a-Service", available online at <https://web.archive.org/web/20200618135109/https://rancher.com/products>, Jun. 18, 2020, 5 pages.
Red Hat, Inc., "Openshift 4.4: The Kubernetes platform for big ideas", available online at <https://web.archive.org/web/20200404130306/https://www.openshift.com/>, Apr. 4, 2020, 6 pages.
Vijaya Krishna, "Comparing Configuration Management Tools: Chef vs. Puppet vs. Ansible," Nov. 5, 2018, pp. 1-5.
Vincent Meoc, "Container as a Service with VMware Admiral," Sep. 26, 2016, pp. 1-7.
Xudong Pang et al., "Efficient Bare Metal Auto-scaling for NFV in Edge Computing," 2018, pp. 67-79, Springer International Publishing.

* cited by examiner

```
ClusterItem {
  id              string($uuid)
                  example: d290f1ee-6c54-4b01-90e6-d701748f0851 name            string
                  example: My K8s Cluster blueprintId     string($uuid)
                  example: d290f1ee-6c54-4b01-90e6-d701748f0851 createdDate     string($date-time)
                  example: 2016-08-29T09:12:33.001Z lastUpdateDate  string($date-time)
                  example: 2016-08-29T09:12:33.001Z state           string
                  example: ready
                  Enum: [ pending, ready, error, offline ]
}
```

```
BlueprintItem {
  id              string($uuid)
                  example: d290f1ee-6c54-4b01-90e6-d701748f0851 name            string
                  example: Simple Kubernetes Cluster version         string
                  example: 1.0.0 k8sVersion      string
                  example: latest createdDate     cstring($date-time)
                  example: 2016-08-29T09:12:33.001Z lastUpdateDate  string($date-time)
                  example: 2016-08-29T09:12:33.001Z machineSpec     string
                  example: bmaas clusterSpec     string
                  example: rke storageSpec     string
                  example: nimble master  {
    quantity      integer
                  example: 1 size          string
  }               example: small
                  Enum: [ nano, micro, small, medium, large, xlarge, 2xlarge ]

worker  {
    quantity      integer
                  example: 1 size          string
  }               example: medium
                  Enum: [ nano, micro, small, medium, large, xlarge, 2xlarge ]

helm  {
    repository    string
                  example: https://github.com/helm/charts charts        string
                  example: List [ "fluentd", "prometheus" ]
  }
}
```

*FIG. 5*

Cluster Blueprint 605

```
"id": "d290f1ee-6c54-4b01-90e6-d701748f0851",
"name": "Simple Example Cluster",
"k8sversion": "latest",
"createdDate": "2015-07-20T15:49:04-07:00",
"lastUpdateDate": "2015-07-20T15:49:04-07:00",
"machineSpec": "bmaas",
"clusterSpec": "rke",
"storageSpec": "nimble",
"master": {
    "quantity": 1,
    "size": "small"
},
"worker": {
    "quantity": 1,
    "size": "medium"
},
"helm": {
    "Repository": "https://github.com/helm/charts",
    "charts": "[\"fluentd\",\"prometheus\"]"
```

CONTAINER-AS-A-SERVICE (CAAS) CONTROLLER FOR PRIVATE CLOUD CONTAINER CLUSTER MANAGEMENT

This application is a continuation application of and claims priority to application Ser. No. 16/908,083, filed on Jun. 22, 2020, now U.S. Pat. No. 11,625,256, the contents of which are hereby incorporated by reference in their entireties.

BACKGROUND

Cloud providers deliver cloud computing based services and solutions to businesses and/or individuals. Virtual hardware, software, and infrastructure may be rented and provider-managed to deliver services in accordance with a variety of cloud service models including Container as a Service (CaaS), Virtual Machine as a Service (VMaaS), Storage as a Service (STaaS), and Bare Metal as a Service (BMaaS).

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to a controller of a managed container service that facilitates selection among bare metal machines available within a private cloud. In the following description, numerous specific details are set forth in order to provide a thorough understanding of example embodiments. It will be apparent, however, to one skilled in the art that embodiments described herein may be practiced without some of these specific details.

As a practical manner, public cloud providers tend to have virtually infinite pools of cloud machines. So, public cloud providers do not have to deal with a number of issues that arise in the context of private clouds. For example, CaaS on bare-metal infrastructure within an environment (e.g., a premises or co-location facility of an organization, entity, or individual, for example, representing a customer of the cloud provider and/or the CaaS) having a limited machine inventory in terms of the number and/or diversity of the types of servers requires a bit more finesse than simply creating a virtual machine based on an essentially limitless hardware pool. As such, a request to create a cluster (e.g., Kubernetes or Docker) within a limited-machine-inventory environment should take into consideration a variety of tradeoffs. For example, when multiple bare metal machines are available in the inventory that have resources (e.g., in terms of processor, memory, network capacity, and/or storage performance) in excess of the needs of the cluster request (which is referred to herein as excess resources), one or more policy-based constraints (e.g., machine cost, cost of operation (power, cooling, etc.), performance, reliability (availability), security, etc.) defined by the cloud provider and/or a CaaS user or administrator may be employed to identify a best fit for the new cluster. A similar approach may also be used when adding or removing a machine to or from a cluster, for example, responsive to autoscaling policies.

Embodiments described herein seek to provide various features to facilitate cluster creation, deployment, and management in the context of a managed CaaS system in which the clusters are dependent at least in part on private cloud infrastructure (e.g., on-premises infrastructure). As described further below, a CaaS controller of the managed CaaS system may receive information defining various aspects of a cluster (cluster information) relating to a desired new cluster via a CaaS portal and may leverage one or more other controllers (e.g., a BMaaS controller, a VMaaS controller, and a STaaS controller) for purposes of obtaining information regarding an available inventory of resources within the private cloud as well as implementing machine deployment decisions.

While for sake of brevity embodiments described herein may focus primarily on selection of bare metal machines in a limited machine inventory environment, the methodologies are equally applicable to creation and management of hybrid clusters involving both physical and virtual infrastructure and/or clusters spanning public and private clouds.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein "cluster information" generally refers to information indicative of resources desired for a cluster. In some embodiments, cluster information may include a specification from bare metal aspects to container application aspects. For example, aspects specified by cluster information may include overall cluster parameters, machine type, networking features, storage specifications, and service definitions. In various embodiments described herein, the cluster information may be represented in the form of a cluster blueprint, which may be used to define the cluster specifics including compute, storage and networking and how these are to be assembled to build a complete functional cluster (e.g., Kubernetes or Docker).

As used herein, an "excess resource metric" generally refers to a metric indicative of an existence of resources in excess of those required to satisfy the needs of a cluster. For example, assuming a candidate machine in a machine inventory having 10 processor cores and 1 Terabyte (TB) of memory, such a candidate machine would have both excess processing capacity and memory capacity in comparison to a new cluster request indicative of a need for a machine with 2 processor cores and 128 Gigabytes (GB) of memory. Excess resource metrics may be used to quantify these excess resources in raw form (e.g., 8 excess processor cores and 872 GB excess memory) or may be normalized (e.g., 0.8 excess processing capacity and 0.872 excess memory capacity).

Figure 1:
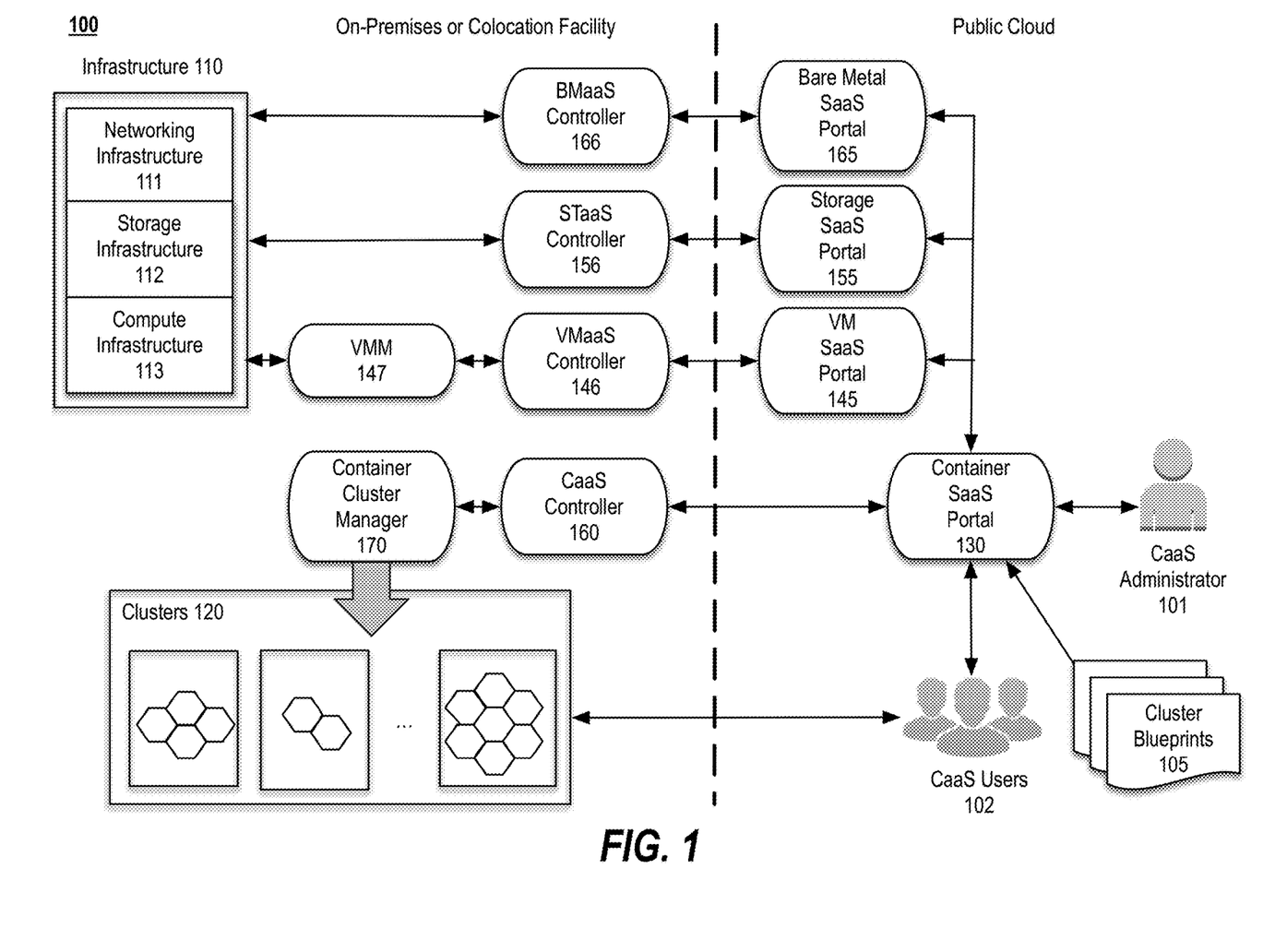
FIG. 1 is a high-level block diagram conceptually illustrating a distribution of components of a system architecture of a managed container service in accordance with an example embodiment.

FIG. 1 is a high-level block diagram conceptually illustrating a distribution of components of a system architecture 100 of a managed container service in accordance with an example embodiment. In various embodiments described herein, the managed container service offers operating system virtualization using containers (e.g., provides Docker containers and Kubernetes orchestration as a service) using infrastructure of a customer's private cloud (e.g., an on-premises data center or a colocation facility). The managed container service may facilitate deployment and operation of cloud native applications for a variety of use cases, including, but not limited to Edge, Artificial Intelligence/Machine Learning (AI/ML), High Performance Compute (HPC). The managed container service may provide a fully-managed solution in which a managed service provider (MSP) operates CaaS instances and assist with the deployment and operation of customers' container-based workloads. According to one embodiment, cluster information may be supplied to a SaaS-based service (e.g., container SaaS portal 130) to define cluster specifics including compute, storage and networking and how these are to be assembled to build a complete functional cluster and a set of controllers (e.g., BMaaS controller 166, STaaS controller 156, VMaaS controller 146, and CaaS controller 160) carry out the instantiation of the cluster in accordance with the cluster information. The resultant cluster may then be consumed by a user (e.g., one of CaaS users 102) and managed by a cluster manager (e.g., container cluster manager 170).

In the context of the present example, components residing within a private cloud (e.g., an on-premises data center or a colocation facility) are shown on the left and components residing within a public cloud are shown on the right. In one embodiment, private cloud components include infrastructure 110, the BMaaS controller 166, the STaaS controller 156, the VMaaS Controller 146, a virtual machine manager (VMM) 147, the CaaS controller 160, and the container cluster manager 170; and public cloud components include a bare metal SaaS portal 165, a storage SaaS portal 155, and the container SaaS portal 130.

According to one embodiment, the container SaaS Portal 130 represents a web-based portal in the form of a cloud hosted multi-tenant service that allows creation of a physical cluster, a virtual cluster or a hybrid cluster based on cluster information, for example, in the form of cluster blue prints 105, which may be predefined or created by a CaaS administrator 101 and/or CaaS users 102. In one embodiment, the use of cluster blueprints 105 facilitates the creation by a user of a complete functional cluster including compute, networking and storage resources as well as a set of applications to be deployed by simply referencing an existing blueprint. A catalog of blueprints may be provided to allow a user to choose a blueprint from the catalog that matches their needs. For example, there may be predefined blueprints that allow for creation of Artificial Intelligence/Machine Learning (AI/ML) clusters as well as other predefined blueprints for general compute clusters. A non-limiting example of a cluster blueprint is described below with reference to FIG. 6.

Continuing with the present example, CaaS administrator 101 and CaaS users 102 may make use of the container SaaS portal 130 to perform various life-cycle management (LCM) operations relating to clusters (e.g., Kubernetes or Docker) that are based on the infrastructure 110, which may include physical and/or virtual infrastructure, including networking infrastructure 111, storage infrastructure 112 and compute infrastructure 113. The LCM operations may include initial compute cluster creation, cluster modification in which infrastructure is added to or removed from a cluster, cluster updates in which existing infrastructure may be modified, and the destruction of a cluster. In one embodiment, Application Programming Interfaces (e.g., Representational State Transfer (REST) APIs) provided by the container SaaS portal 130 support full LCM operations on clusters and are based on the OpenAPI (Swagger) definition. The status of cluster LCM operations may be tracked from the container SaaS portal 130 or from the Kubernetes command line, for example. The container SaaS portal 130 may also use REST to communicate with other services (e.g., the bare metal SaaS portal 165, the storage SaaS portal 155, and the VM SaaS portal 145) upon which it depends to obtain information about the infrastructure 110 and/or and implement various tasks associated with the LCM operations. Further details regarding a non-limiting example of the container SaaS portal 130 are described below with reference to FIG. 2.

The bare metal SaaS portal 165 may represent a web-based portal in the form of a cloud hosted service of a particular BMaaS provider (which may be the same or a different provider than the cloud provider) that interacts with the BMaaS controller 166 to carry out various aspects of instantiation of the cluster. For example, the BMaaS controller 166 may be used to install the appropriate firmware and software onto a bare metal machine selected for inclusion with a cluster by the CaaS controller 160.

Similarly, the storage SaaS portal 155 and the VM SaaS portal 145 may represent web-based portals of respective STaaS and VMaaS providers used by the customer and which are used to interface with the infrastructure 110 via the STaaS controller 156 and the VMaaS controller 146, respectively. In one embodiment, the VMaaS controller 146 may make use of the VMM 147 to create appropriately sized control plane nodes to run a container control plane for the requested cluster. Advantages of the layered approach implemented by system architecture 100 include enabling the container SaaS portal 130 to be built on other "as a service" offerings (e.g., BMaaS, STaaS, and VMaaS) of the cloud provider or a third-party provider, facilitating extensibility to include other offerings (e.g., networking and compute), as well as enabling the creation of value-add services on top of CaaS or Kubernetes as a Service (KaaS). More or fewer types of infrastructure or providers may be supported depending upon the needs of the particular implementation, for example, by adding or removing appropriate SaaS portals and associated controllers.

In the context of the present example, the CaaS controller 160 runs on-premises and is controlled by the container SaaS portal 130. In one embodiment, the CaaS controller 160 may be a Kubernetes cluster and may be controlled via kubectl API calls invoked by the container SaaS portal 130. In such a scenario, the CaaS controller 160 is effectively a bootstrap cluster that allows target clusters (e.g., clusters 120) to be created and managed. In some embodiments, one or more of the BMaaS controller 166, the STaaS controller 156, and the VMaaS controller 146 may also be integrated into the bootstrap cluster, for example, using "kube-native" methods. Further details regarding a non-limiting example of the CaaS controller 160 are described below with reference to FIG. 3.

The container cluster manager 170 may be responsible for installing a container orchestration system on newly provisioned nodes. In one embodiment, the container cluster manager 170 includes a "Kubernetes Engine" (e.g., Hewlett Packard Enterprise (HPE) Container Platform, Rancher Kubernetes Engine (RKE), Loodse Kubermatic Container Engine, Google Kubernetes Engine (GKE), Kubernetes+ Cluster API, or others) to install Kubernetes and create a cluster. After the cluster is created, the CaaS controller 160 may monitor the state of the cluster and can take corrective action if needed. For example, if a machine fails in a way that cannot be repaired, another machine can be allocated, provisioned and added to the cluster to replace the failed machine.

The various portals (e.g., bare metal SaaS portal 165, storage SaaS portal 155, VM SaaS portal, and container SaaS portal 130) and controllers (e.g., BMaaS controller 166, STaaS controller 156, VMaaS controller 146, and CaaS controller 160) and the functionality performed by them may be implemented by hardware, software, firmware and/or a combination thereof. For example, the portals and controllers may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry.

While for sake of simplicity various examples may be described with reference to a single customer or a single customer site (e.g., on-premises datacenter or colocation facility), it is to be appreciated that the various portals described herein may interact with controllers associated with multiple customers and/or distributed across multiple sites. Additionally, although in the present example, the controllers and SaaS portals are shown distributed between the private cloud and public cloud in a particular manner, depending upon the particular implementation these components may be distributed differently. For example, one or more of the controllers (e.g., the CaaS controller 160) may be provided within a public cloud. Also, the same or different system architectures (e.g., system architecture 100) may be implemented for one or more customers of the cloud provider. It is further contemplated that various components of the system architecture may be implemented by the same or different vendors or service providers. For example, a cloud provider that has one or more existing "as a service" offerings may leverage such existing offerings and/or may make use of third-party services.

Figure 2:
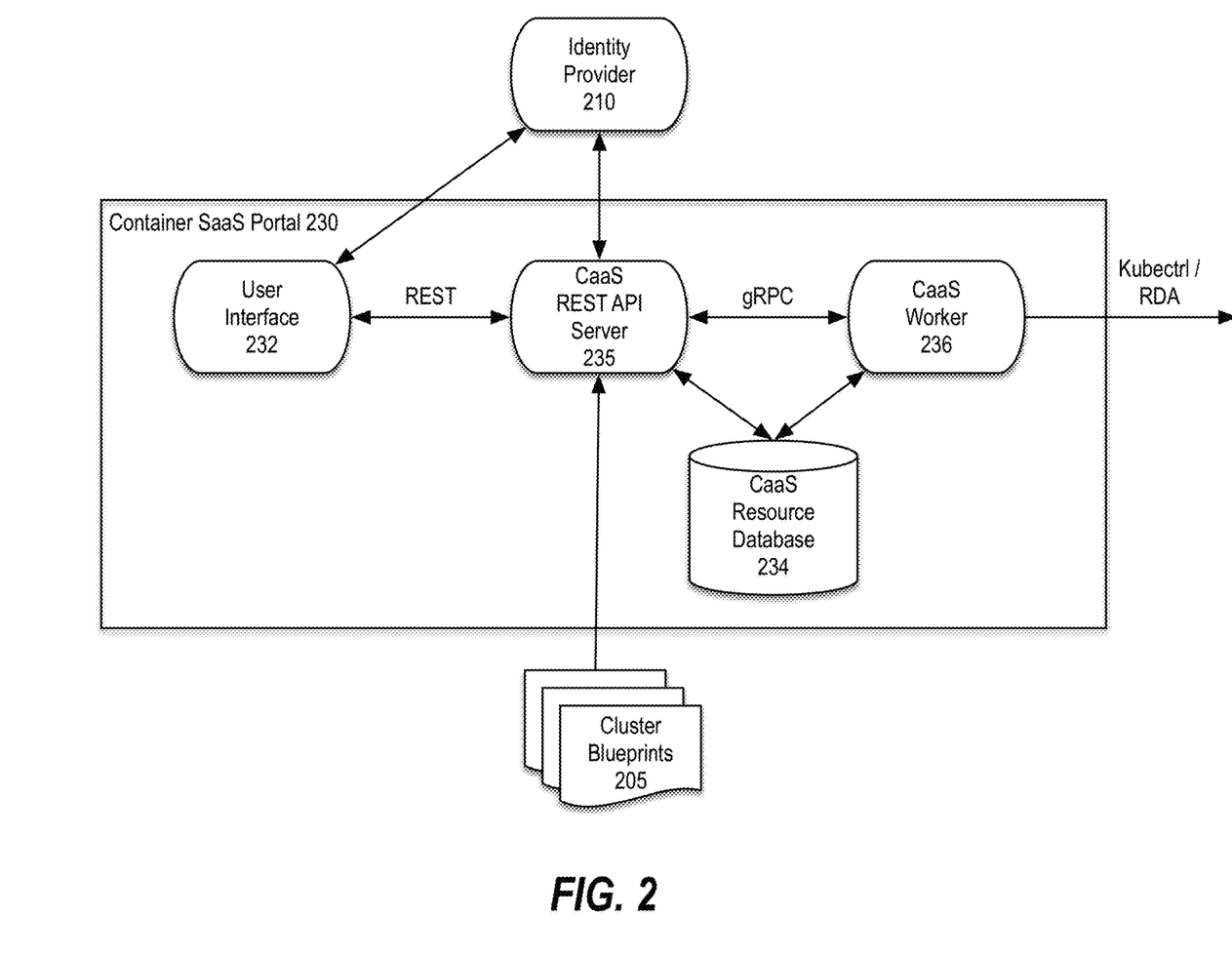
FIG. 2 is a block diagram conceptually illustrating various functional units of a container Software-as-a-Service (SaaS) portal in accordance with an example embodiment.

FIG. 2 is a block diagram conceptually illustrating various functional units of a container SaaS portal 230 in accordance with an example embodiment. In the context of the present example, the container SaaS portal 230 includes a user interface 232, a CaaS REST API server 235, a CaaS worker 236, and a CaaS resource database 234. In one embodiment, the user interface 232 and the CaaS REST API server 235 represent a northbound interface (or frontend) for accepting REST requests to perform Create, Read, Update and Delete (CRUD) operations on clusters in accordance with cluster blueprints 205 and persists them in the CaaS resource database 234. For example, the CaaS REST API server 235 may provide self-service APIs for users (e.g., CaaS users 102) to create their own clusters (e.g., Kubernetes clusters) and administrator APIs for CaaS administrators (e.g., CaaS administrator 101) to create and assign cluster to groups of users.

According to one embodiment, separation of concerns and scaling may be addressed by implementing a backend in the form of one or more workers (e.g., the CaaS worker 236) of the container SaaS portal 230 that are responsible for ensuring that operations requested via the REST interface of the container SaaS portal 230 are realized. In the context of the present example, an internal inter-processor communication (IPC) mechanism (e.g., gRPC Remote Procedure Call (gRPC)) is utilized to communicate between the frontend and the backend and the CaaS worker 236 may communicate information regarding cluster requests to the CaaS controller (e.g., CaaS controller 160) via kubectl over Remote Data Access (RDA).

In one embodiment, role-based access control (RBAC), for example, supported by identity provider 210, may be used to securely accommodate the needs of different user personas. In this manner, for example, separation can be achieved between (i) cloud provider operations or administrative personnel (e.g., CaaS administrator 101) that use the container SaaS portal 230 to operate and manage customers' managed container environments and (ii) customers' (tenants') self-service users (e.g., CaaS users 102) of the container SaaS portal 230 for CaaS and/or KaaS.

Figure 3:
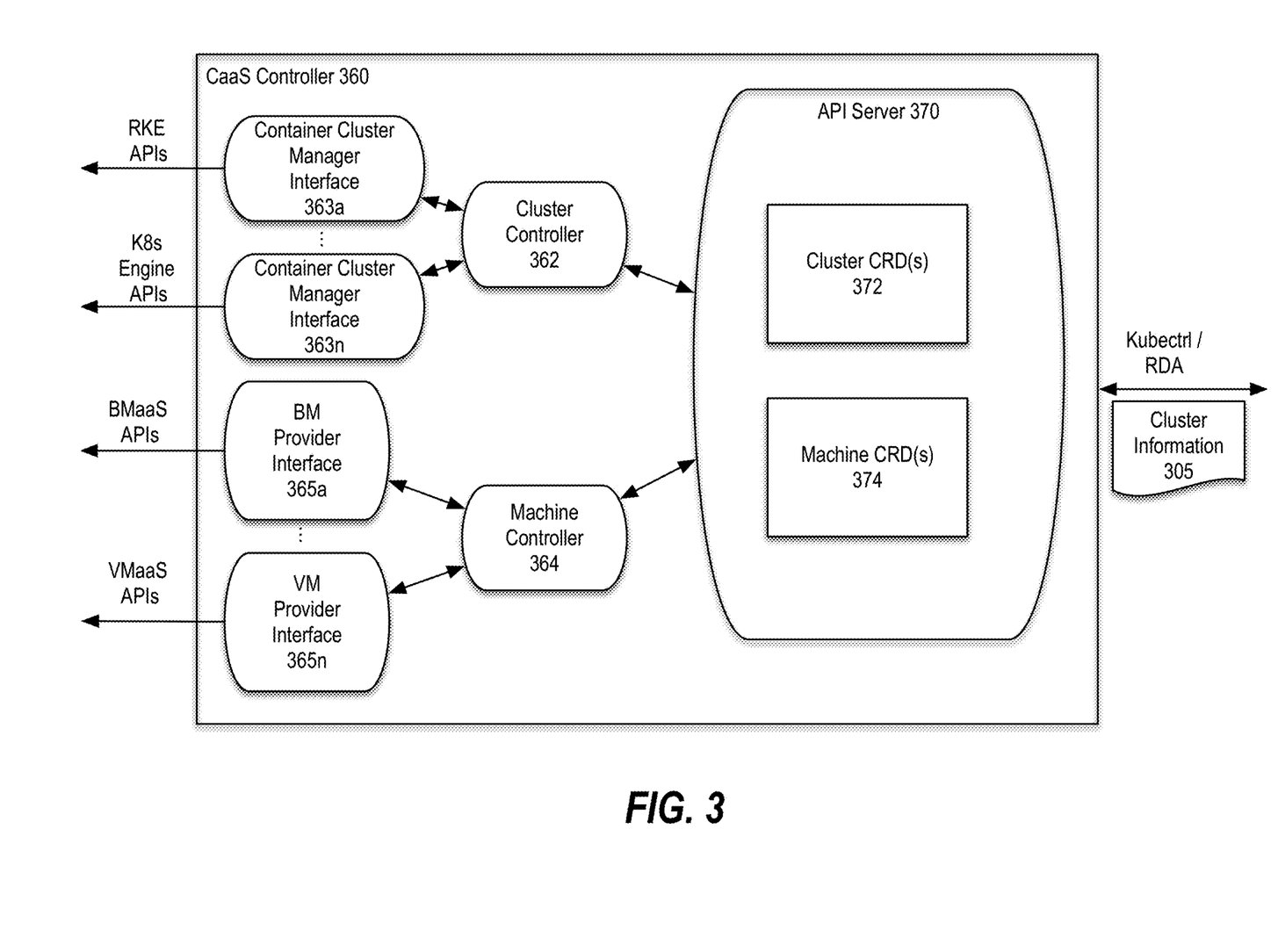
FIG. 3 is a block diagram conceptually illustrating various functional units of a CaaS controller in accordance with an example embodiment.

FIG. 3 is a block diagram conceptually illustrating various functional units of a CaaS controller 360 in accordance with an example embodiment. In the context of the present example, the CaaS controller 360 includes an API server 360, a cluster controller 362, container cluster manager interfaces 363a-n, a machine controller 364, and various provider interfaces 365a-n. The CaaS controller 360 and the functionality performed by the CaaS controller 360 them may be implemented by hardware, software, firmware and/ or a combination thereof. For example, the CaaS controller 360 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry.

According to one embodiment, creation of a cluster involves selection or input of cluster information 305 (e.g., in the form of a cluster blueprint (e.g., cluster blueprint 105)) via a CaaS SaaS portal (e.g., container SaaS portal 130). The CaaS SaaS portal may control the CaaS controller 360 via API calls (e.g., kubectl API calls) to the API server 370. In the present example, the API server 370 provides Custom Resource Definitions (CRDs) (e.g., cluster CRD(s) 372 and machine CRD(s)) for various objects supported by the managed container service, including, for example, a cluster, a machine, a machine set, and a machine deployment. Depending upon the particular implementation, the CRDs may be based on Kubernetes community "Cluster API" CRDs.

Cluster objects may provide a high level description of their respective clusters including an Internet Protocol (IP) address, Domain Name Service (DNS) information, and the like. In one embodiment, machine objects are agnostic to physical versus virtual machines and include provider-specific details for the desired machines. Machine set objects may be supported to allow specification of a set of multiple machines. Machine deployment objects may be used to automate upgrades.

Responsive to the cluster CRD(s) 372, the cluster controller 362 may direct cluster operations to an appropriate container cluster manager interface 363*a-n*. For example, depending upon a cluster specification indicated within the cluster information 305, the cluster controller 362 may use container cluster manager interface 363*a* to interact with an RKE Kubernetes distribution or container cluster manager interface 363*n* to interact with another type of Kubernetes engine.

Similarly, machine controller 364 may be responsible for directing machine operations to an appropriate provider interface 365*a-n*. Depending upon a machine specification indicated within the cluster information 305, the machine controller 364 may use BM provider interface 365*a* to interact with a BMaaS provider (e.g., via BMaaS APIs associated with a bare metal SaaS portal (e.g., bare metal SaaS portal 165)) and VM provider interface 365*n* to interact with a VMaaS provider (e.g., via VMaaS APIs associated with a VM SaaS portal (e.g., VM SaaS portal 145)). For example, machine controller 364 may utilize Terraform providers for infrastructure (e.g., BMaaS, VMaaS or any IaaS) and Ansible playbooks to manage installed OS components (e.g., Docker, agents, base configurations, and initial Helm charts).

Figure 4:
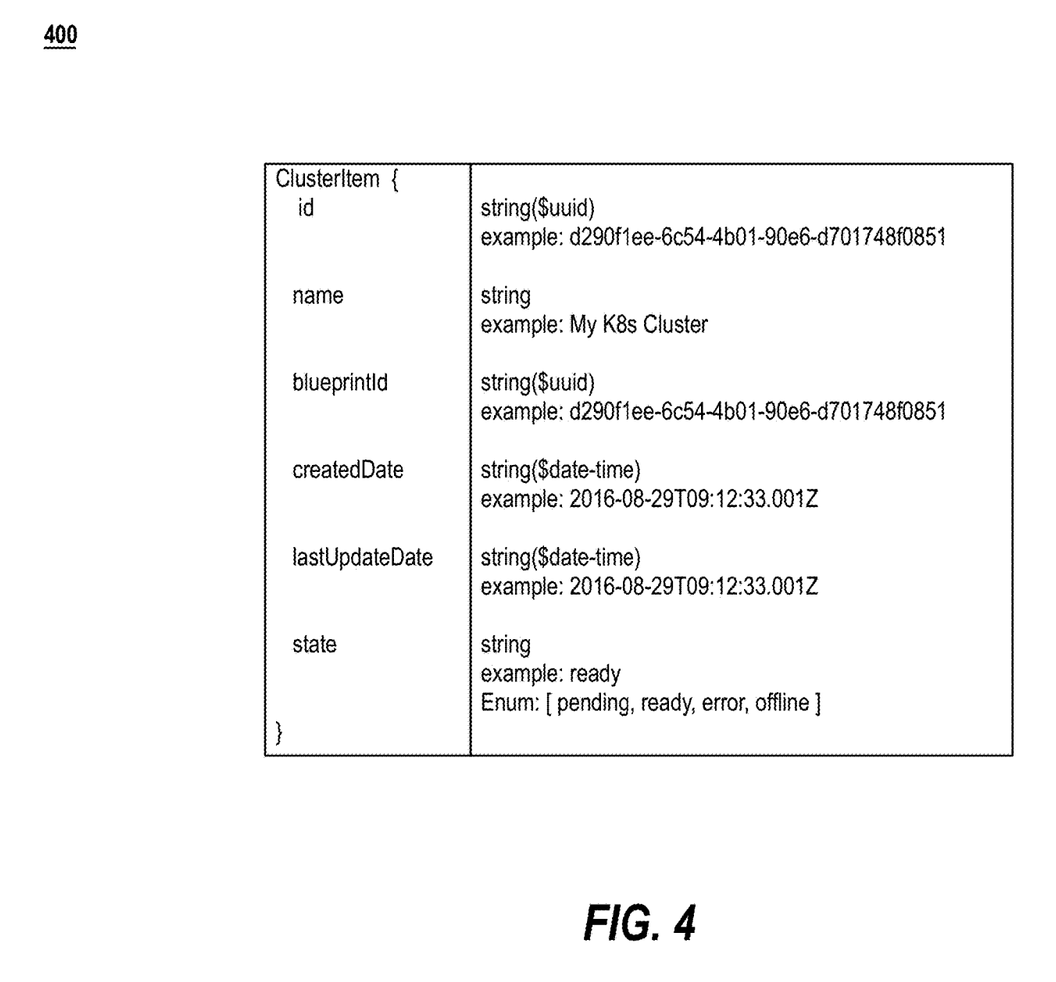
FIG. 4 illustrates data associated with a cluster item of a blueprint meta-language or schema in accordance with an example embodiment.

FIG. 4 illustrates data associated with a cluster item 400 of a blueprint meta-language or schema in accordance with an example embodiment. In various embodiments described herein, declarative models may be used for cluster LCM using cluster blueprints (e.g., cluster blueprints 105 or 205). In one embodiment, a blueprint meta-language (e.g., JavaScript Object Notation (JSON), YAML Ain't Markup Language (YAML), and/or the Terraform language) or schema, includes (i) the cluster blueprint, (ii) machine blueprints defining different types of compute resources to be used as part of the cluster blueprint; (iii) networking blueprints defining networking topologies and features for the cluster; (iv) storage blueprints defining storage to be used within the cluster; and (v) service blueprints defining services to be pre-installed on a newly created cluster.

In the context of the present example, cluster item 400 includes an ID, a name, a blueprintID, a createdDate, a lastUpdateDate, and a state. The ID may be a string representing a unique identifier (e.g., a Universally Unique Identifier (UUID)) for the cluster. The name may be a string representing a user-assigned name to the cluster and which may be displayed in the catalog, for example. The blueprintID may be a string representing a unique identifier (e.g., a UUID) for a blueprint item associated with the cluster. The createdDate may indicate the date and time at which the cluster was created and may be represented in the form of a string. The lastUpdateDate may indicate the date and time at which the cluster was last updated and may be represented in the form of a string. The state, for example, monitored and updated by a CaaS controller (e.g., CaaS controller 160) may be selected from a predefined set of enumerated values (e.g., pending, ready, error, or offline) and may be represented in the form of a string.

Figure 5:
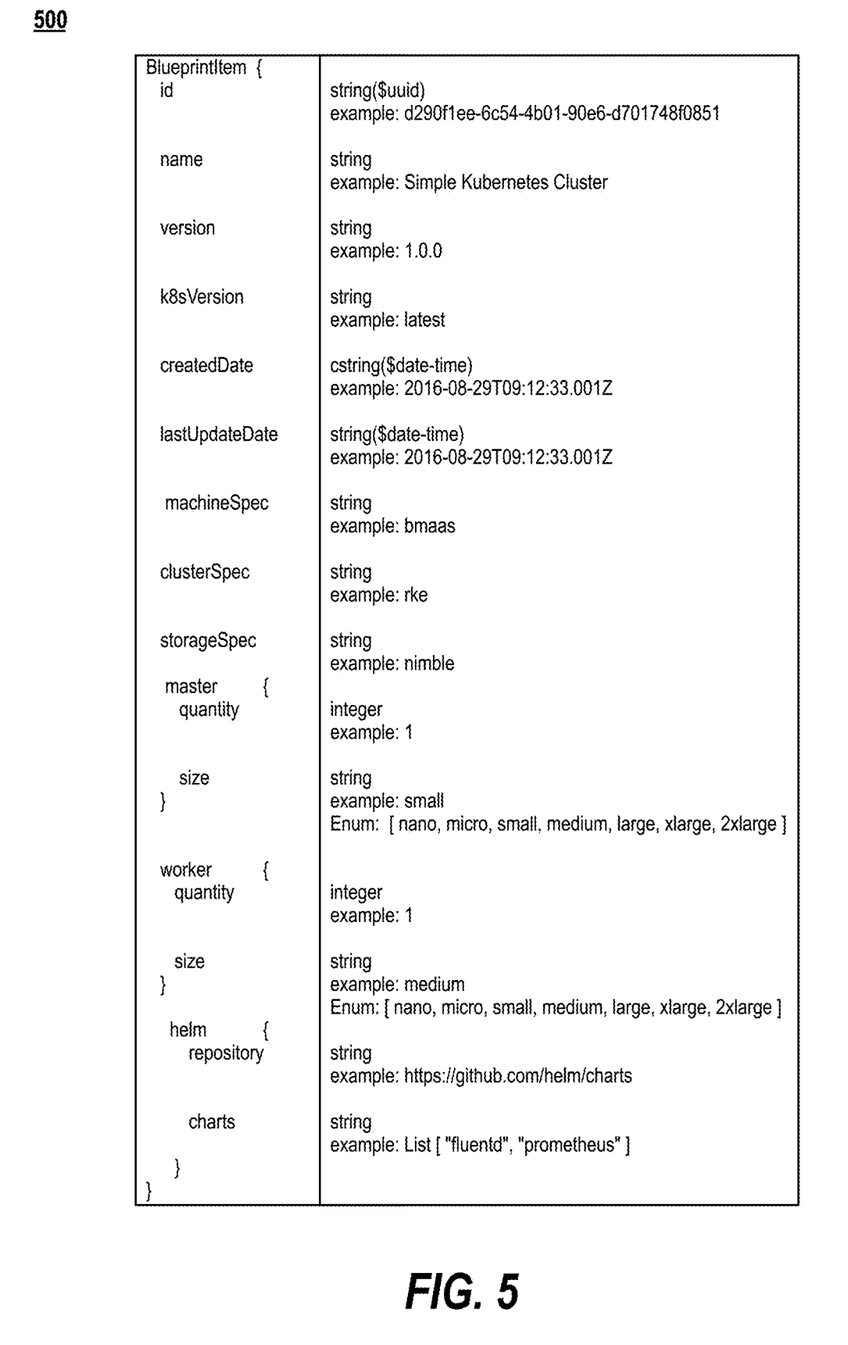
FIG. 5 illustrates data associated with a blueprint item of a blueprint meta-language or schema in accordance with an example embodiment.

FIG. 5 illustrates data associated with a blueprint item 500 of a blueprint meta-language or schema in accordance with an example embodiment. The blueprint item 500 may declaratively describe the desired cluster, for example, including master and worker node sizes, amounts, and quality attributes (e.g., availability and performance). Cluster blueprints may also define required storage and networking characteristics as well as other curated services to deploy, for example, cluster and workload observability services. Depending upon the particular implementation, cluster blueprints may also include service-specific representations of desired state as well as other well-known representations (e.g., Terraform infrastructure plans).

In the context of the present example, blueprint item 500 includes an ID, a name, a version, a k8sVersion, a createdDate, a lastUpdateDate, a machine specification, a cluster specification, a storage specification, and information regarding desired master and worker nodes. As described above with reference to the cluster item, the ID may be a string representing a unique identifier (e.g., a UUID) for the blueprint. The name may be a string representing a user-assigned name to the blueprint and which may be displayed in the catalog, for example. The createdDate may indicate the date and time at which the blueprint was created and may be represented in the form of a string. The lastUpdateDate may indicate the date and time at which the blueprint was last updated and may be represented in the form of a string. The machine specification may include information indicative of the provider for the desired machine. The cluster specification may include information indicative of the desired container cluster manager (e.g., container cluster manager 170), for example, the desired Kubernetes engine. The storage specification may include information indicative of a type of storage infrastructure (e.g., storage infrastructure 112) to be used in the cluster.

Figure 6:
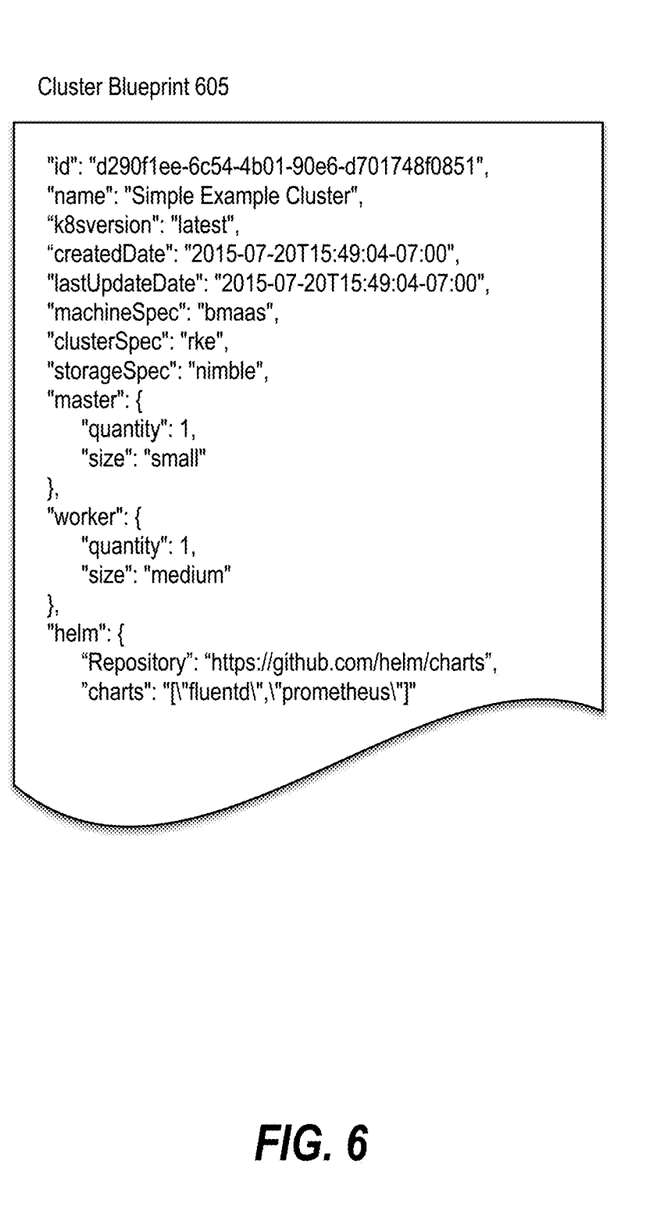
FIG. 6 illustrates a cluster blueprint in accordance with an example embodiment.

FIG. 6 illustrates a cluster blueprint 605 in accordance with an example embodiment. In the context of the present example, cluster blueprint 605 defines a Kubernetes cluster to be created via RKE having one small master node and one medium bare metal-based worker node.

The various portals and controllers described herein and the processing described below with reference to the flow diagrams of FIGS. 7-9 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 10 below.

Figure 7:
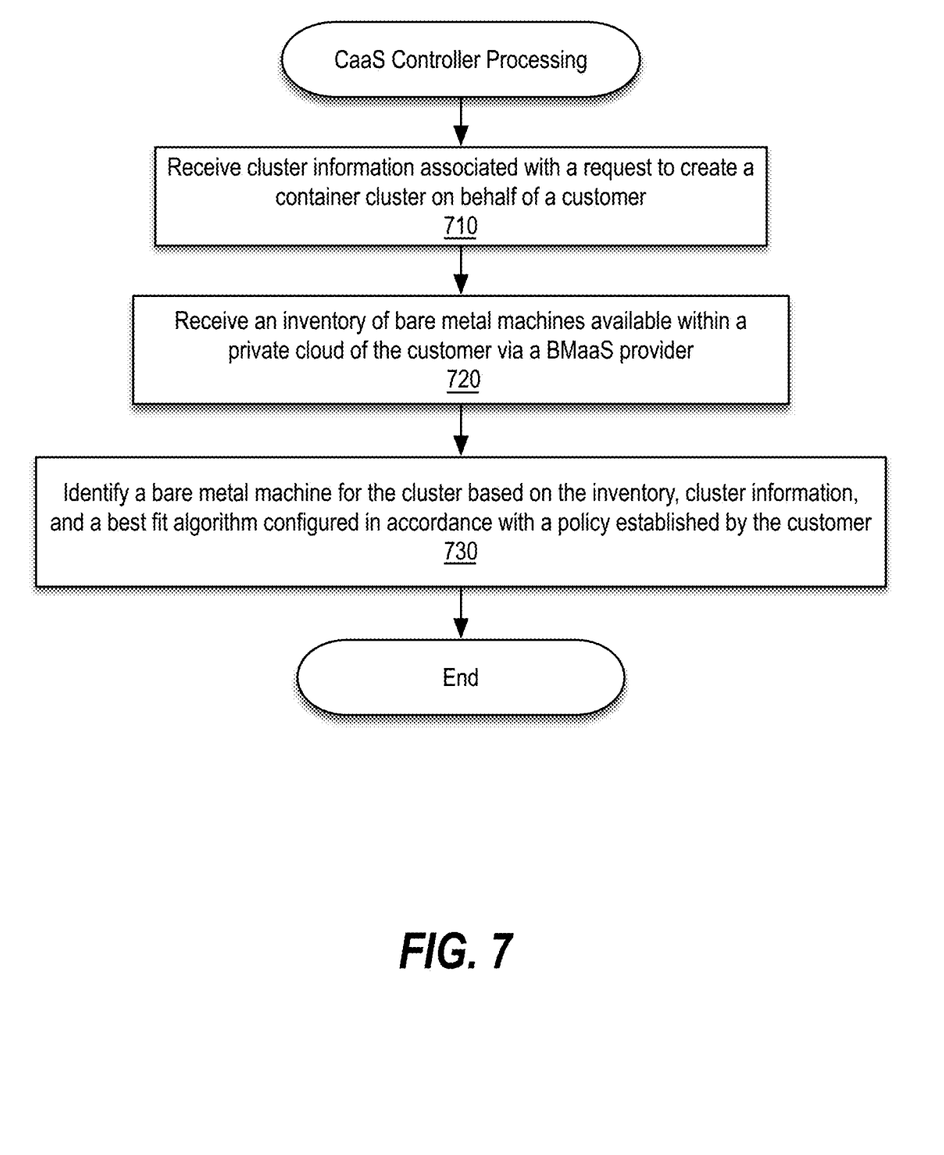
FIG. 7 is a flow diagram illustrating CaaS controller processing in accordance with an example embodiment.

FIG. 7 is a flow diagram illustrating CaaS controller processing in accordance with an example embodiment. In the context of the present example, a cloud provider may have been engaged by a particular customer or multiple customers to provide and support a managed container service that makes use of their private cloud infrastructure, for example, including bare metal servers.

At block 710, cluster information associated with a request to create a container cluster on behalf of a customer is received by a CaaS controller. According to one embodiment, the CaaS controller (e.g., CaaS controller 160) runs within a customer's private cloud, for example, on on-premises infrastructure or infrastructure within a colocation facility used by the customer. The CaaS controller may receive the cluster information in the form of a cluster blueprint (e.g., cluster blueprint 105) from a container SaaS portal (e.g., container SaaS portal 130) running in the same or a different private or public cloud as the CaaS controller. Depending upon the particular implementation the cluster information may declaratively describes the desired cluster. For example, a cluster blueprint may be selected by a CaaS user (e.g., CaaS user 102) from a predefined set of cluster blueprints presented via a user interface (e.g., user interface 232) in which the selected cluster blueprint includes master and worker node sizes, amounts, and quality attributes (e.g., availability and/or performance). Cluster blueprints may also define desired storage and networking characteristics as well as other curated services to deploy, for example cluster and workload observability services. Cluster blueprints may also include system-specific representations of desired state as well as other well-known representations (e.g., Terraform infrastructure plans).

At block 720, an inventory of bare metal machines available within a private cloud of the customer is received via a BMaaS provider. According to one embodiment, the inventory contains real-time information indicative of respective resources (e.g., a number of processor cores, an amount of memory, network capacity, and/or storage performance) for one or more types of infrastructure (e.g., infrastructure 110), including a set of bare metal machines, that are currently available (e.g., are not currently deployed for use by another cluster) for use in connection with supporting the managed container service. Depending upon the particular implementation, the inventory may be requested from the BMaaS provider by the CaaS controller directly (e.g., via a bare metal SaaS portal of the BMaaS provider) or indirectly (e.g., via the CaaS portal).

In various embodiments, the inventory may include or otherwise be mapped to metadata or other information associated with the available bare metal machines for use in connection with prioritizing, guiding, directing or otherwise influencing machine selection, for example, by optimizing, minimizing, or maximizing various factors or conditions, Non-limiting examples of the metadata or other information include information indicative of one or more of machine characteristics/attributes (e.g., cost, power consumption, heat, performance, security, reliability, etc.) in the form of relative or absolute metrics/ratings or raw or normalized data.

At block 730, a bare metal machine is identified for the cluster based on the inventory received in block 720, the cluster information received in block 710, and a best fit algorithm configured in accordance with a policy established by or on behalf of the customer. Despite the customer having a variety of bare metal machine configurations, it is unlikely the customer will have a sufficient number of such configurations to precisely match the range of all potential cluster requests. For the sake of example, suppose the managed container service uses four enumerated sizes (Small, Medium, Large, Extra Large) for four resources: processor, memory, network capacity, and storage performance. In this example, there are 256 combinations of the resources, but it is unlikely that the customer will have 256 different machine configurations to choose from and the number of possibilities grows very rapidly as the enumerated categories increase and/or as resources are added. Because it is impractical for a customer to attempt to have bare metal machine configurations that meet every possible machine specification that may be desired by a CaaS user, it is desirable to have a machine selection process to facilitate selection of an appropriate machine from the available inventory to satisfy the user's request. For example, while a number of the available machines may have sufficient resources to meet the needs indicated by the user's request, some of the machines may have one or more types of resources in excess of those needed by the desired cluster or may be likely to be needed to service other cluster requests. As such, embodiments described herein provide a policy-based approach to allow the cloud provider and/or the customer to express one or more machine-selection priorities to be applied as part of a best fit algorithm. Non-limiting examples of best fit processing that may be part of the best fit algorithm are described below with reference to FIGS. 8 and 9.

In the context of various examples described herein, the CaaS user may specify the desired cluster in a form in which resources are described at a reasonably high level. While it is possible to have the user specify a machine with particularity, for example, a particular model of a particular manufacturer with a particular type of processor, a specific amount of memory, and a particular type of Graphics Processing Unit (GPU), it is typically more efficient for a user to specify a machine based on something more abstract. Depending upon the particular manner in which the machines are categorized, an internal mapping of these categories (e.g., sizes) to the reality presented to the user may be utilized as part of the machine selection process.

Figure 8:
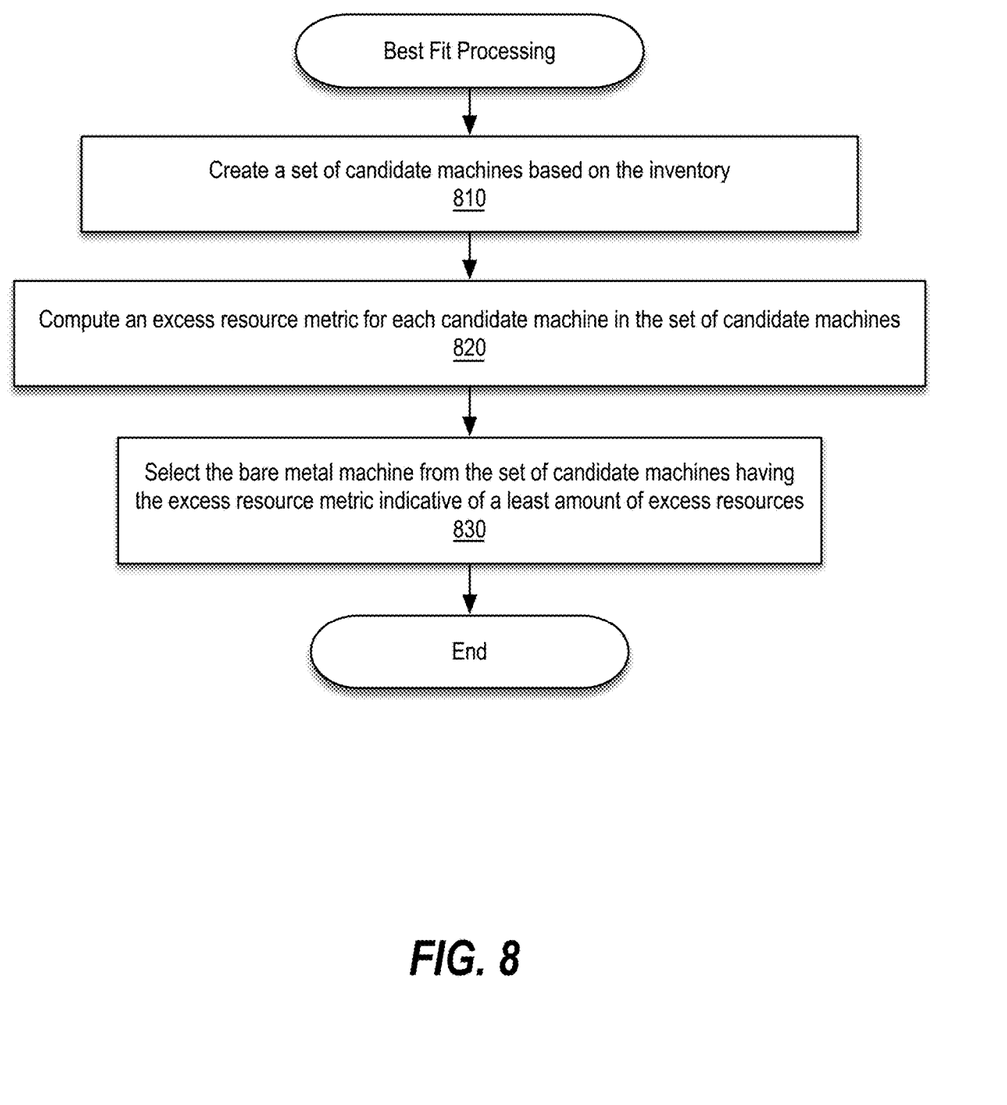
FIG. 8 is a flow diagram illustrating best fit processing in accordance with an example embodiment.

FIG. 8 is a flow diagram illustrating best fit processing in accordance with an example embodiment. At block 810, a set of candidate machines is created based on the inventory. According to one embodiment, the set of candidate machines is a subset of the available bare metal machines in the inventory that have sufficient resources to satisfy the cluster request. That is, each candidate machine in the set of candidate machines has resources equal to or greater that indicated by the request. Identification of the candidate set may involve using an internal mapping of machine categories to corresponding resource ranges to transform a cluster request expressed in terms of a machine category to explicit quantities of resources. Then, for each available machine in the inventory the amount of each type of resource needed to satisfy the request may be compared to corresponding amounts of each type of resource of the machine configuration to determine whether to add the available machine to the candidate set.

At block 820, an excess resource metric for each candidate machine in the set of candidate machines is calculated. According to one embodiment, the excess resource metric may be calculated concurrently with the identification of the candidate set. Alternatively, the excess resource metric may be performed after the candidate set has been completed. The calculation may involve subtracting the amount of resources needed to satisfy the request from those available as part of a particular machine configuration and aggregating or averaging the results for each type of resource into a single excess resource metric. Alternatively, the excess resource metric may comprise multiple components—one for each type of resource.

At block 830, a bare metal machine in the set of candidate machines having the excess resource metric indicative of a least amount of excess resources is selected for the cluster.

Figure 9:
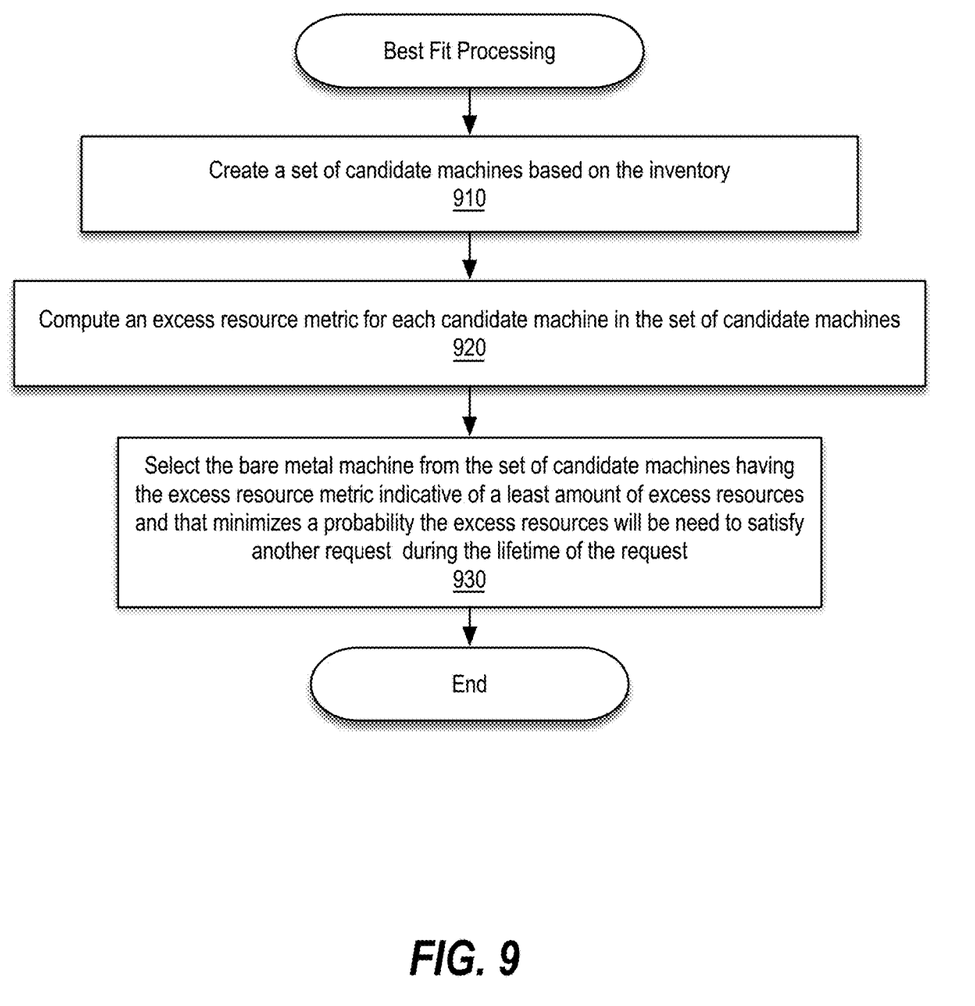
FIG. 9 is a flow diagram illustrating best fit processing in accordance with another example embodiment.

FIG. 9 is a flow diagram illustrating best fit processing in accordance with another example embodiment. In the context of the present example, additional information is assumed to be available to assist the machine selection process. For example, information regarding a lifespan of the cluster request may be included as part of the cluster request or learned based on historical data. Additionally, information that quantifies a probability metric at the machine-level or the resource-level that is indicative of a probability that a machine or resource will be needed to satisfy a subsequent request during the lifespan may be included with the inventory or learned based on historical data. Blocks 910 and 920 may be as described above with reference to FIG. 8. At block 930, the bare metal machine is selected from the set of candidate machines having an excess resource metric indicative of a least amount of excess resources and that also minimizes a probability the excess resources will be needed to satisfy another request during the lifetime of the request. According to one embodiment, this minimization involves minimizing the sum of the probability metrics of the excess resources of the selected bare metal machine. In alternative embodiments, the minimization may be performed as the machine-level to minimize the probability the selected machine will be needed to satisfy another request during the lifetime of the request.

While for sake of brevity some examples of a machine selection approach have been provided above with reference to FIGS. 8 and 9, those skilled in the art will appreciate the applicability of the methodologies described herein extend beyond these particular examples. For example, to the extent metadata or information associated with bare metal machines is available that is indicative of their relative power usage, security, reliability, and/or other factors that may be desirable as the basis on which to prioritize machine selection, such metadata or information may be taken into consideration by the machine selection process. Furthermore, in some embodiments, machine learning and/or big data analytics may be used by the CaaS controller to reveal patterns and/or probabilities of cluster request for users, workloads, machines and/or resources. Since the provider manages the site and therefore has insight into, among other things, the users, cluster requests made by particular users over time, machine demand and usage over time, and what is being run on the private cloud infrastructure, historical data may be used alone or in combination with machine learning to assist the machine selection process. For example, the managed CaaS system may "learn" that a particular user commonly requests bigger machines than necessary for the workload at issue and a result the managed CaaS system may allocate a machine that is slightly smaller than requested by the particular user. Similarly, the managed CaaS system may observe a pattern that the particular user tends to request undersized machines and proactively offer the particular user the option to select a larger machine. Alternatively or additionally, the managed CaaS system may take into consideration machine and/or resource demand/usage patterns so as to optimize allocation of machines in a manner that increases the likelihood of machine availability for anticipated workload demands and hence profitability of the managed CaaS for the cloud provider.

Additional machine selection examples include, but are not limited to:

Using information regarding security vulnerability of particular machine configurations, operating systems, application programs and/or combinations thereof to guide the machine selection process Using of machine learning to optimize machine configurations, operating system parameters, application programs and/or combinations thereof for commonly observed workloads Using characteristics that affect availability such as ensuring that machines providing redundancy have independent power connections and network paths Ensuring workloads that might require significant power are placed on machines in locations with favorable cooling (e.g., put jobs that are likely to run hot on machines that are right over the air conditioner vents)

Using performance characteristics to optimize the performance of the resources allocated. For example, if there are multiple speed networks in the data center, ensuring workloads that require significant network bandwidth are allocated on high speed networks.

Cost of operations—some machines require more power and cooling to perform the same work, and for workloads that require significant power, placing them on machines that have lower power requirements.

Reliability—Some machines might have better track records

Excess capacity—If certain workloads are more likely than others to grow, potential future disruptions may be avoided by putting such workloads on bigger machines.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 10:
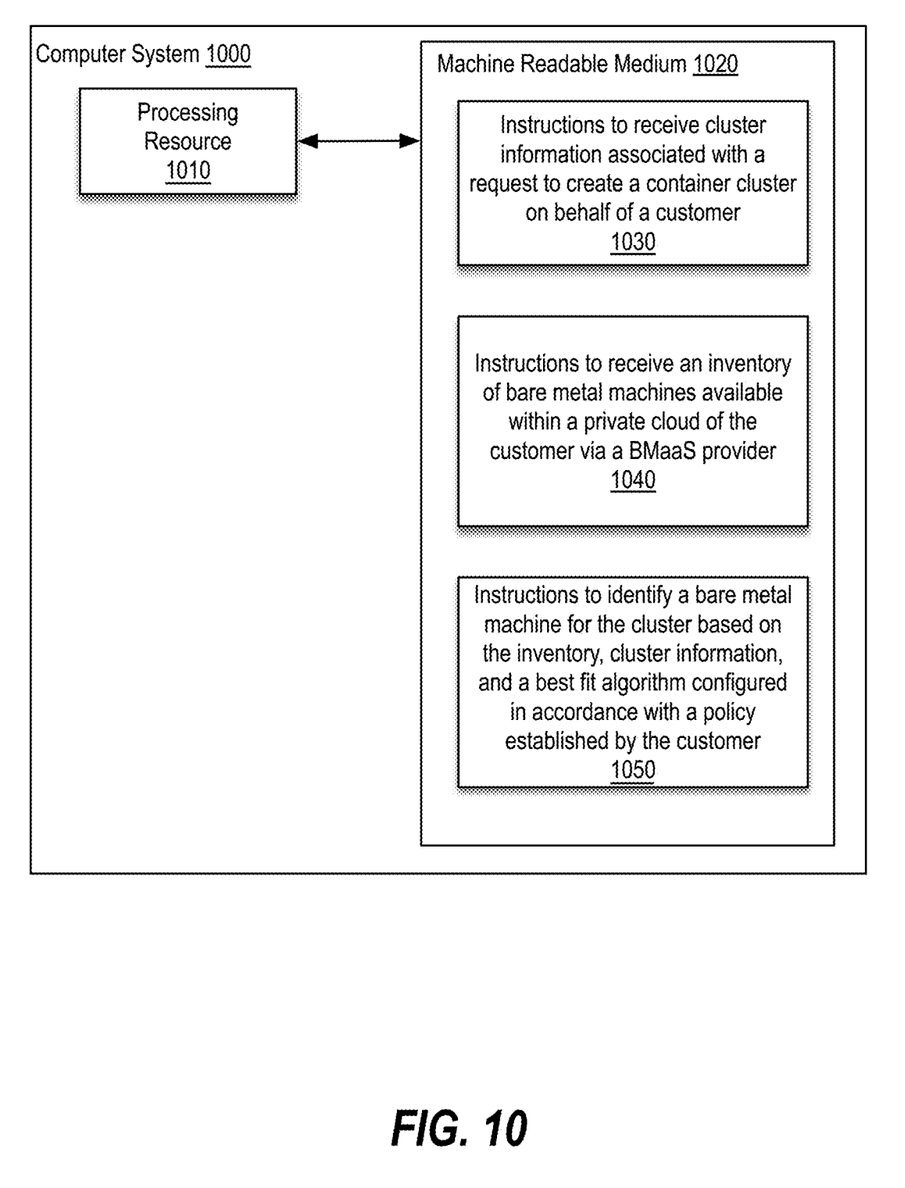
FIG. 10 is a block diagram of a computer system in accordance with an embodiment.

FIG. 10 is a block diagram of a computer system in accordance with an embodiment. In the example illustrated by FIG. 10, computer system 1000 includes a processing resource 1010 coupled to a non-transitory, machine readable medium 1020 encoded with instructions to perform a private cloud gateway creation processing. The processing resource 1010 may include a microcontroller, a microprocessor, central processing unit core(s), an ASIC, an FPGA, and/or other hardware device suitable for retrieval and/or execution of instructions from the machine readable medium 1020 to perform the functions related to various examples described herein. Additionally or alternatively, the processing resource 1010 may include electronic circuitry for performing the functionality of the instructions described herein.

The machine readable medium 1020 may be any medium suitable for storing executable instructions. Non-limiting examples of machine readable medium 1020 include RAM, ROM, EEPROM, flash memory, a hard disk drive, an optical disc, or the like. The machine readable medium 1020 may be disposed within the computer system 1000, as shown in FIG. 10, in which case the executable instructions may be deemed "installed" or "embedded" on the computer system 1000. Alternatively, the machine readable medium 1020 may be a portable (e.g., external) storage medium, and may be part of an "installation package." The instructions stored on the machine readable medium 1020 may be useful for implementing at least part of the methods described herein.

In the context of the present example, the machine readable medium 1020 is encoded with a set of executable instructions 1030-1050. It should be understood that part or all of the executable instructions and/or electronic circuits included within one block may, in alternate implementations, be included in a different block shown in the figures or in a different block not shown.

Instructions 1030, upon execution, cause the processing resource 1010 to receive cluster information associated with a request to create a container cluster on behalf of a customer. In one embodiment, instructions 1030 may correspond generally to instructions for performing block 710 of FIG. 7.

Instructions 1040, upon execution, cause the processing resource 1010 to receive an inventory of bare metal machines available within a private cloud of the customer via a BMaaS provider. In one embodiment, instructions 1040 may correspond generally to instructions for performing block 720 of FIG. 7.

Instructions 1050, upon execution, cause the processing resource 1010 to identify a bare metal machine for the cluster based ono the inventory, cluster information, and a best fit algorithm configured in accordance with a policy established by the customer. In one embodiment, instructions 1050 may correspond generally to instructions for performing the block 730 of FIG. 7.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A system comprising:
a Container-as-a-Service (CaaS) hardware controller configured to:
receive cluster information associated with a request to create a container cluster on behalf of a customer, the cluster information comprising master and worker node sizes for the container cluster;
receive an inventory of bare metal machines available within a private cloud of the customer;
identify a particular bare metal machine for the container cluster based on the inventory of the bare metal machines, the cluster information, and a best fit algorithm, the best fit algorithm configured in accordance with a policy established by the customer, wherein the particular bare metal machine is identified by:
creating a set of candidate machines based on the inventory of the bare metal machines, the set of candidate machines comprising a subset of the bare metal machines that have sufficient resources to satisfy the request;
calculating an excess resource metric for each candidate machine in the set of candidate machines; and
selecting, as the particular bare metal machine, a particular candidate machine in the set of candidate machines having the excess resource metric indicative of a least amount of excess resources; and
create the container cluster on the particular bare metal machine.

2. The system of claim 1, wherein the CaaS hardware controller receives the cluster information from a Container-as-a-Service (CaaS) portal, and wherein the CaaS hardware controller receives the inventory of the bare metal machines from a Bare-Metal-as-a-Service (BMaaS) portal.

3. The system of claim 2, wherein the CaaS hardware controller, the CaaS portal, and the BMaaS portal are operable within a public cloud.

4. The system of claim 2, wherein the CaaS hardware controller is operable within the private cloud, and wherein the CaaS portal and the BMaaS portal are operable within a public cloud.

5. The system of claim 1, further comprising:
a Bare-Metal-as-a-Service (BMaaS) hardware controller configured to instantiate the container cluster by installing firmware and software onto the particular bare metal machine; and
a Virtual Machine as a Service (VMaaS) hardware controller configured to create a control plane node for the container cluster.

6. The system of claim 1, wherein the cluster information further comprises a version of the container cluster.

7. The system of claim 1, wherein the cluster information further comprises bare metal aspects of the container cluster, virtual machine aspects of the container cluster, storage aspects of the container cluster, and networking aspects of the container cluster.

8. The system of claim 1, wherein the request further comprises a lifespan of the container cluster, wherein the inventory of the bare metal machines further comprises information that quantifies a probability metric, for each candidate machine of the set of candidate machines, indicative of a probability that the candidate machine will be needed to satisfy a subsequent request during the lifespan, and wherein the particular candidate machine has the probability metric indicative of a lowest probability the excess resources will be needed to satisfy another request during the lifespan of the container cluster.

9. The system of claim 1, wherein the CaaS hardware controller is further configured to:

learn a historical pattern associated with a user of the customer, wherein the particular bare metal machine for the container cluster is further identified based on the historical pattern.

10. A method comprising:
receiving, by a Container-as-a-Service (CaaS) controller, cluster information associated with a request to create a container cluster on behalf of a customer, the cluster information comprising master and worker node sizes for the container cluster and a version of the container cluster;
receiving, by the CaaS controller, an inventory of bare metal machines available within a private cloud of the customer;
identifying, by the CaaS controller, a particular bare metal machine for the container cluster based on the inventory of the bare metal machines, the cluster information, and a best fit algorithm, the best fit algorithm configured in accordance with a policy established by the customer, wherein identifying the particular bare metal machine for the container cluster includes:
creating a set of candidate machines based on the inventory of the bare metal machines, the set of candidate machines comprising a subset of the bare metal machines that have sufficient resources to satisfy the request;
calculating an excess resource metric for each candidate machine in the set of candidate machines; and
selecting, as the particular bare metal machine, a particular candidate machine in the set of candidate machines having the excess resource metric indicative of a least amount of excess resources; and
creating, by the CaaS controller, the container cluster on the particular bare metal machine.

11. The method of claim 10, wherein the cluster information is received from a Container-as-a-Service (CaaS) portal, wherein the inventory of the bare metal machines is received from a Bare-Metal-as-a-Service (BMaaS) portal, and wherein the CaaS controller, the CaaS portal, and the BMaaS portal are operable within a public cloud.

12. The method of claim 10, wherein the cluster information is received from a Container-as-a-Service (CaaS) portal, wherein the inventory of the bare metal machines is received from a Bare-Metal-as-a-Service (BMaaS) portal, wherein the CaaS controller is operable within the private cloud, and wherein the CaaS portal and the BMaaS portal are operable within a public cloud.

13. The method of claim 10, further comprising:
interacting, by the CaaS controller, with a Bare-Metal-as-a-Service (BMaaS) controller to instantiate the container cluster by installing firmware and software onto the particular bare metal machine; and
interacting, by the CaaS controller, with a Virtual Machine as a Service (VMaaS) controller to create a control plane node for the container cluster.

14. The method of claim 10, wherein the cluster information further comprises bare metal aspects of the container cluster, virtual machine aspects of the container cluster, storage aspects of the container cluster, and networking aspects of the container cluster.

15. The method of claim 10, wherein the request further comprises a lifespan of the container cluster, wherein the inventory of the bare metal machines further comprises information that quantifies a probability metric, for each candidate machine of the set of candidate machines, indicative of a probability that the candidate machine will be needed to satisfy a subsequent request during the lifespan, and wherein the particular candidate machine has the probability metric indicative of a lowest probability the excess resources will be needed to satisfy another request during the lifespan of the container cluster.

16. The method of claim 10, further comprising:
learning, by the CaaS controller, a historical pattern associated with a user of the customer, wherein the particular bare metal machine for the container cluster is further identified based on the historical pattern.

17. A non-transitory machine readable medium storing instructions that when executed by a processing resource, cause the processing resource to:
receive cluster information associated with a request to create a container cluster on behalf of a customer, the cluster information comprising master and worker node sizes for the container cluster;
receive an inventory of bare metal machines available within a computing cloud;
receive a learned historical pattern associated with a user of the customer;
identify a particular bare metal machine for the container cluster based on the inventory of the bare metal machines, the cluster information, the learned historical pattern, and a best fit algorithm, the best fit algorithm configured in accordance with a policy established by the customer, wherein the particular bare metal machine is identified by:
creating a set of candidate machines based on the inventory of the bare metal machines, the set of candidate machines comprising a subset of the bare metal machines that have sufficient resources to satisfy the request;
calculating an excess resource metric for each candidate machine in the set of candidate machines; and
selecting, as the particular bare metal machine, a particular candidate machine in the set of candidate machines having the excess resource metric indicative of a least amount of excess resources; and
create the container cluster on the particular bare metal machine.

* * * * *